United States Patent [19]

Van Helden et al.

[11] 3,898,258
[45] Aug. 5, 1975

[54] PREPARATION OF ALKENYL ISOCYANATES

[75] Inventors: Robert Van Helden; Albertus J. Mulder, both of Amsterdam, Netherlands

[73] Assignee: Shell Oil Company, Houston, Tex.

[22] Filed: Nov. 19, 1973

[21] Appl. No.: 417,030

[30] Foreign Application Priority Data
Dec. 15, 1972 Netherlands.................... 7217060

[52] U.S. Cl........ 260/453 P; 252/438; 260/77.5 CR; 260/248 NS; 260/453 AL
[51] Int. Cl.²...................................... C07C 118/00
[58] Field of Search................................ 260/453 P

[56] References Cited
UNITED STATES PATENTS

| 3,470,228 | 9/1969 | Heinert | 260/453 |
| 3,480,627 | 11/1969 | Heinert | 260/248 |

*Primary Examiner*—Lewis Gotts
*Assistant Examiner*—Dolph H. Torrence

[57] ABSTRACT

A one-step process for the preparation of 1-and/or 2-isocyano-1-alkene comprises contacting isocyanic acid with an alpha-alkyne in the presence of zinc and/or cadmium isocyanate. A supported catalyst and a process for preparing said supported catalyst suitable for the above process are disclosed.

7 Claims, No Drawings

PREPARATION OF ALKENYL ISOCYANATES

BACKGROUND OF THE INVENTION

1. Field of the Invention

This invention is drawn to a one-step process for the preparation of vinyl isocyanates and to supported catalysts suitable to carry out the process.

2. Prior Art

Various processes for the preparation of organic isocyanates are known, for example (1) by reacting phosgene with a salt of a primary amine, (2) by heating a carboxylic acid azide in a neutral solvent, (3) from hydroxamine acid with liberation of water, (4) by reacting organic sulphates with salts of cyanic acid and (5) by thermal decomposition of carbamates and urea derivatives. These known processes require, however, the use of starting compounds corresponding with the isocyanates to be prepared, e.g. primary amines or carboxylic acid azides, so that these processes are relatively expensive.

Preparation of alkenyl isocyanates by a two-step process is disclosed in the combination of U.S. Pat. No. 3,480,627 issued Nov. 25, 1969 to D. H. Heinert and U.K. Pat. No. 1,227,209 issued Apr. 7, 1971 also to D. H. Heinert. This two step step process would involve the preparation of a trialkenyl isocyanurate using isocyanuric acid and an alkyne in the presence of a zinc catalyst at superatmosphere pressures then pyrolysis of the tri-alkenyl isocyanurate at very high temperatures and sub-atmospheric pressure to form the alkenyl isocyanates. This high temperature cracking reaction is complicated by the tendency of the tri-alkenyl isocyanurates and the alkenyl isocyanates to polymerize, thus reducing the yield of alkenyl isocyanate.

The process of this invention is a one step process, starting with simple inexpensive materials, which avoids the problems of using superatmospheric pressures with acetylenes and subjecting the alkenyl isocyanate to prolonged high temperatures.

SUMMARY OF THE INVENTION

This invention is drawn to a one-step process for the preparation of 1-and/or 2-isocyano-1-alkenes having six or less carbon atoms which comprises contacting isocyanic acid with an alpha-alkyne having five or less carbon atoms in the presence of a zinc and/or cadmium isocyanate. The invention is also drawn to a novel supported zinc and/or cadmium isocyanate catalyst suitable for carrying out the above process.

The 1 and 2 isocyano-1-alkenes of the present invention are useful monomers for the preparation of polymers and resins as described in U.S. Pat. No. 2,334,476 issued Nov. 16, 1943 and U.S. Pat. No. 2,326,287 issued Aug. 10, 1943.

DESCRIPTION OF THE PREFERRED EMBODIMENTS

The 1-and 2-isocyano-1-alkenes of this invention are those having 3 to 6 carbon atoms inclusive. They are vinyl isocyanate, 1-and 2-isocyano-1-propene, 1-and 2-isocyano-1-butene, 1-and 2-isocyano-3-methyl-1-butene and 1-and 2-isocyano-1-pentene. The preferred isocyano-1-alkene is vinyl isocyanate. 2-isocyano-1-pentene.

The alpha-alkynes used to prepare the isocyano-1-alkenes of the present invention are those 1-alkynes having from 2 to 5 carbon atoms inclusive. They are ethyne (acetylene), propyne, 1-butyne, 3-methyl-1-butyne and 1-pentyne. The preferred alkyne is acetylene.

The isocyanic acid required for the present invention may be prepared in any known manner. For example, it may be formed by the reaction of an acid with a metal salt of isocyanic acid or by the thermal decomposition of cyanuric acid as disclosed in "Reagents for Organic Synthesis", by L. F. Fieser and M. Fieser (1967), pp. 170–1.

In general the process is carried out at a temperature between about 100°C to about 350°C. Temperatures higher than 350°C may be used but they do not provide further advantages. The reaction is run at sub-atmospheric or superatmospheric pressure, i.e., from about 0.5 to about 10 atmospheres pressure, but atmospheric pressure is generally preferred. Ordinarily it is advantageous to operate with alpha-alkyne to isocyanic acid molar ratios of greater than one. Molar ratios of from about 2:1 to about 15:1 are useful, about 4:1 to about 15:1 are preferred and about 8:1 to about 15:1 are particularly preferred.

The amount of zinc and/or cadmium isocyanate catalyst may vary widely depending on how the reaction is to be conducted. It may vary from essentially catalytic amounts to amounts substantially in excess of the reactants in contact with it at any point in time.

The best selectivities are obtained when ethyne is the alpha-alkyne, i.e., selectivities to vinyl isocyanate of 80% are obtainable at a complete isocyanic acid conversion. By selectivity to an isocyano-1-alkene is meant the percentage of the converted isocyanic acid which has been converted into this isocyano-1-alkene. 1-Propyne, 1-butyne and 1-pentyne are converted into mixtures of 1-and 2-isocyano-1-alkene, for example 1-propyne into a mixture of 1-and 2-isocyano propene. It is possible to start from mixtures which contain two or more alpha-alkynes with at most 5 carbon atoms per molecule.

According to a preferred embodiment of the present invention it is possible to form the isocyanic acid in situ. This may be effected in a very suitable manner by passing a gaseous mixture which contains an alpha-alkyne with at most 5 carbon atoms per molecule and a hydrogen halide through a salt melt which contains a salt of isocyanic acid and a zinc salt. Part of the salt of isocyanic acid reacts with the hydrogen halide to form isocyanic acid in situ and another part reacts with the zinc salt to form zinc isocyanate which serves as catalyst for the preparation of isocyano-1-alkenes. Salts or isocyanic acid which are suitable for use in the melt are alkali metal isocyanates such as lithium, sodium or potassium isocyanate; excellent results have been obtained with potassium isocyanate. Of the zinc salts the halides such as zinc chloride, zinc bromide or zinc iodide are very suitable; excellent results have been obtained with zinc chloride.

In this in situ production of isocyanic acid and then isocyanoalkenes, the molar ratio of alpha-alkyne to hydrogen halide in the gaseous mixture which is passed into the salt melt, is not critical. This ratio preferably exceeds 1, since this has a favorable effect on the selectivity to isocyano-1-alkene. Molar ratios of alpha-alkyne to hydrogen halide vary from about 2:1 to about 15:1, preferably from about 4:1 to about 15:1, most preferably from about 8:1 to about 15:1.

The temperature of the salt melt is preferably maintained at a value below about 350°C since the use of temperatures above 350°C, which may be applied, usually does not yield any further advantages. It is therefore advisable to reduce the solidification point of the melt by the addition of suitable salts, for example potassium chloride, sodium chloride, potassium bromide or sodium bromide. The use of temperatures in the range of about 225°C to about 350°C is preferred and from about 250°C to about 300°C is highly preferred. Very good results are obtained with salt melts which contain zinc chloride and potassium chloride in an eutectic or substantially eutectic composition. These eutectic mixtures have a solidification point of about 228°C and contain about 54 mol % of zinc chloride, based on zinc chloride and potassium chloride.

Of the hydrogen halides which may be used hydrogen bromide, hydrogen chloride and hydrogen iodide are preferred; hydrogen chloride is particularly preferred.

According to another preferred embodiment of the present invention the zinc isocyanate and/or cadmium isocyanate is/are used supported on a carrier. Very good results have been obtained with zinc isocyanate supported on a carrier.

Examples of suitable carriers are inert inorganic oxides, such as alumina (alpha, gamma, eta and theta), silica, titania, ziroconia, boria, magnesia, thoria or compositions thereof, bauxite, kieselguhr, and pumice. Alumina, in particular gamma-alumina, is preferred because this oxide gives a relatively high selectivity to isocyano-1-alkene and zinc isocyanate and cadmium isocyanate can be dispersed on it very suitably. The use of silica as a carrier gives a relatively low selectivity to isocyano-1-alkene, for example about 35–40% of that obtained when using gamma-alumina under the same conditions. It is possible to use synthetic or natural alumina. The synthetic alumina may be prepared in any desirable manner, e.g. by precipitation of an aluminium hydroxide gel from an aluminum salt solution with the aid of a suitable alkaline reagent, for example an aqueous ammonia solution, followed by separation and drying of the gel and calcination of the dried gel.

Not critical and varying within wide limits, even outside those specified below, are the specific surface area and pore volume of the carrier, the quantities, based on the carrier, in which the zinc isocyanate and/or cadmium isocyanate are used on the carrier, the particle size in which the carrier is used, the molar ratio between alpha-alkyne and isocyanic acid in the starting mixture, the space velocity at which the starting mixture is passed through the catalyst bed in continuous operation and the pressure.

The specific surface area of the carrier will vary from about 1 to about 500 meter$^2$/gram (m$^2$/g), preferrably from about 100 to about 500 m$^2$/g, determined by the BET method, as explained by Paul H. Emmett in Chapter 2 of the book "Catalysts", Vol. 1 (Reinhold Publishing Corporation, New York, 1954). The zinc isocyanate and/or cadmium isocyanate is used on the carrier in a quantity of, for example, about 1–20% by weight, calculated as metal on the carrier, preferrably, about 1–15% by weight; good results were obtained at about 3–8% by weight. The catalyst is used in the form of flakes, spheres, rings, pellets or extrudates with a diameter of 0.1–5 millimeters (mm) or powders having a particle size of 0.01–0.1 mm. The space velocity of the starting mixture of alkyne and isocyanic acid is, for example, between 100 and 5000 normalized liters (Nl, as measured at 0.0°C and atmospheric pressure) of gas mixture per kilogram of catalyst per hour. The pressure may be atmospheric, sub- or superatomospheric, for example about 0.5 to about 10 atmospheres. Very good results have been obtained at atmospheric pressure.

The temperatures at which isocyanic acid is contacted with alpha-alkyne in the presence of supported zinc isocyanate and/or cadmium isocyanate has no critical upper limit but is preferably between about 175°C and about 350°C, most preferably between about 200°C and about 300°C.

The isocyanic acid and the alpha-alkyne may be used without or — preferably — in the presence of an inert diluent, for example, nitrogen or a noble gas.

These new catalysts may be prepared in any desirable manner. The zinc isocyanate or cadmium isocyanate can be supported on the carrier by impregnating the carrier with a solution of a suitable zinc or cadmium compound. For example if the water is chosen as the impregnating solvent, zinc acetate is very suitable as a water soluble zinc compound. After the carrier has been impregnated with the desired zinc and/or cadmium compound, it is dried to remove the solvent. Subsequently, the carrier is impregnated with a solution of a suitable alkali metal isocyanate, e.g. potassium isocyanate in water, and then again dried. It is advisable to wash the dried carrier with water until the wash water used shows a negative reaction to potassium ions, for example when the addition of some drops of a saturated solution of tartaric acid in water to a mixture of equal volume of wash water used and ethanol no longer produces any deposit. The use of catalysts which contain not only zinc isocyanate and/or cadmium isocyanate but also alkali metal compounds on the carrier in fact decreases the activity of the catalyst and the selectivity to isocyano-1-alkenes. The washed catalyst is dried and then, if desired, heated for several hours at a temperature between, for example, about 400°C and about 600°C. This heating may take place, for example, in a stream of air, nitrogen, carbon dioxide or a noble gas.

The application of the zinc isocyanate and/or cadmium isocyanate on the carrier may also be effected by impregnating the carrier with a solution of a complex compound formed from zinc isocyanate or cadmium isocyanate and an organic compound in an organic solvent, removing the organic solvent from the impregnated carried by heating and removing the organic compound from the complex compound by further heating, leaving zinc isocyanate and/or cadmium isocyanate. Pyridine and its derivatives combined with zinc isocyanate have proved very suitable as organic solvents; chloroform is a convenient organic solvent. Very good results have been obtained with pyridine in particular.

The process for preparing isocyano-1-alkenes is carried out in a batchwise or continuous manner, with stationary catalyst beds, suspended catalysts, fluidized catalyst beds, in a stirred reactor or by using another contacting technique.

Since isocyano-1-alkenes readily polymerize, it is advisable to pass the reaction products through a collecting vessel, in which a temperature between about −75°C and about −25°C is maintained, and to condense the isocyano-1-alkenes therein. It is also advisable to cover those parts of the equipment which come into contact with isocyano-1-alkene, with a layer of a compound, which prevents polymerization of the isocyano-1-alkene (a polymerization inhibitor) for example a layer of 1,3-dinitrobenzene. The condensate formed in the collecting vessel does not contain any isocyanic acid when stationary catalyst beds are used and yields high-purity isocyano-1-alkene when it is subjected to distillation. When suspended catalysts are used, the conversion of isocyanic acid is generally relatively low, for example 15–20%, and a condensate is obtained which comprises isocyano-1-alkene and isocyanic acid. This condensate may be separated into isocyano-1-alkenes and isocyanic acid by means of distillation at subatmospheric pressure; the use of atmospheric distillation is not possible here, since isocyanic acid and isocyano-1-alkenes will polymerize. When using suspended catalysts it is advisable for the isocyanic acid and alkyne introduced into the suspension to be distributed very intensively therein and to use a liquid resistant to the reaction temperature, for example a low aromatic, high-boiling paraffinic oil with a low aromatic content.

The isocyano-1-alkenes prepared according to the invention, in particular vinyl isocyanate, are valuable difunctional monomers useful for the preparation of polymers and resins.

To illustrate the manner in which the invention may be carried out, the following Embodiments are given. It is to be understood, however, that the Illustrative Embodiments are for the purpose of illustration and the invention is not to be regarded as limited to any of the specific materials or conditions recited herein.

ILLUSTRATIVE EMBODIMENT I

A mixture of ethyne and hydrogen chloride was passed in an ethyne/HCl molar ratio of 3:1 for 7 hours with intensive stirring at a rate of 12 Nl/h through a quantity of 300 milliliters (ml) of a melt which consisted of 50 mol % zinc chloride, 40 mol % of potassium chloride and 10 mol % of potassium isocyanate and which was maintained at a temperature of 310°C. The melt was in a tube having an internal diameter of 3.2 centimeters (cm). The gases discharged from the melt were passed through a collecting vessel in which a temperature of −40°C was maintained. Polymerization of vinyl isocyanate was prevented by precoating the inner walls of the line to the collecting vessel and of the collecting vessel itself with a layer of 1,3-dinitro-benzene. The condensate collected in the said vessel contained 75% by weight of vinyl isocyanate and 25% by weight of ethyne oligomers, including 1,5-hexadiyne. The selectivity to vinyl isocyanate was 60% (based on converted potassium isocyanate) at an ethyne conversion of 12%. The melt contained a water-insoluble polymer, formed from isocyanic acid.

ILLUSTRATIVE EMBODIMENT II

Gamma-alumina pellets having a diameter between 0.6 and 1 mm, a specific surface area of 350 m²/g, a pore volume of 0.57 ml/g and a sodium content below 0.03% by weight (calculated as sodium) were heated at a temperature of 520°C for 3 hours and cooled in a nitrogen stream. Subsequently, 50 g of the cooled aluminium oxide was successively impregnated at ambient temperature with 28.5 ml of water which contained 8.9 g of $Zn(CH_3COO)_2 \cdot 2 H_2O$, dried over a steam bath for 3 hours at a pressure of 20 cm Hg at 150°C, impregnated with 28.5 ml of water which contained 6.3 g of potassium isocyanate and dried as stated hereinbefore. The potassium compounds were subsequently removed from the alumina by washing with water until no further deposit was formed in the wash water used after the addition of an equal volume of ethanol and some drops of a saturated solution of tartaric acid in water. The washed alumina catalyst was dried by passing over it dried air at ambient temperature and subsequently at a pressure of 20 cm Hg at a temperature of 150°C and was then maintained in air at a temperature of 360°C for 6 hours. The resulting catalyst contained 5% by weight of zinc isocyanate, calculated as zinc on gamma-alumina.

PREPARATION OF VINYL ISOCYANATE

A vertically disposed quartz tube with an inside diameter of 16 mm consisted of two parts. The lower part contained cyanuric acid and was maintained at a temperature between 600° and 800°C. The isocyanic acid resulting from this heating was passed upwards by a nitrogen stream introduced into the lower end of the quartz tube and conducted through the upper part of the quartz tube. The upper part contained a 30-cm-high bed of the supported catalyst (48 g) which has been prepared as described above in this Illustrative Embodiment. While ethyne was being introduced into the bottom of the catalyst bed, the latter was maintained at a temperature of 220°C. The rates at which ethyne and nitrogen mixture were supplied were such that the molar ratio of ethyne, isocyanic acid and nitrogen in the gas mixture introduced into the bottom of the upper part of the tube was equal to 1:0.2 : 0.3 at a space velocity of 240 Nl of gas mixture per kg of catalyst per hour. The gases discharged from the quartz tube were passed through a collecting vessel in which a temperature of −50°C was maintained. Polymerization of vinyl isocyanate was prevented by precoating the inner walls of the line to the collecting vessel and of the collecting vessel itself with a layer of 1,3-dinitrobenzene.

After 7 hours of operation all the cyanuric acid decomposed and the test was stopped. Vinyl isocyanate having a purity in excess of 99% and an atmospheric boiling point of 39°C was separated by means of distillation from the condensate collected in the said vessel. The condensate did not contain any isocyanic acid. The selectivity to vinyl isocyanate was 80% at an ethyne conversion of 11%. All the isocyanic acid had been converted.

ILLUSTRATIVE EMBODIMENT III

A quantity of 50 g of pyridine was added to a solution of 30.6 g of $Zn(CH_3COO)_2 \cdot 2 H_2O$ and 11.4 g of potassium isocyanate in 150 ml of water. The resultant mixture was then maintained overnight at a temperature of 0.0°C. The crystals formed by this cooling were filtered off and recrystallized from chloroform. By this treatment a quantity of 18 g of crystals having the formula $Zn(NCO)_2 \cdot 2 C_5H_5N$ was obtained. Subsequently, 50 g of gamma-alumina which had been preheated at a temperature of 520°C for 3 hours and which had the same properties as that used in Embodiment II, was impregnated with 35 ml of chloroform in which 12 g of the above-mentioned crystals were dissolved. To remove the chloroform, the impregnated alumina was heated at a temperature of 60°C in a nitrogen stream and subsequently heated slowly to a temperature of 180°C. After it had been heated at 180°C for 4 hours all pyridine had been removed and the temperature was maintained at 250°C for a further 3 hours. The resultant catalyst contained 5% by weight of the zinc isocyanate, calculated as zinc on alumina.

PREPARATION OF VINYL ISOCYANATE

The preparation of vinyl isocyanate was carried out as described in Embodiment II and the same results were also obtained.

ILLUSTRATIVE EMBODIMENT IV

Illustrative Embodiment II is repeated using cadmium chloride in place of zinc chloride. Good yields of vinyl isocyanate are obtained.

ILLUSTRATIVE EMBODIMENT V

Illustrative Embodiment II is repeated using 1-pentyne in place of ethyne. A mixture of 1-cyano-1-pentene and 2-cyano-1-pentene is obtained.

I claim as my invention:

1. The process for preparing 1-and/or 2-isocyano-1-alkenes having 6 or less carbon atoms which comprises,
   a. contacting isocyanic acid with a 1-alkyne having five or less carbon atoms in the presence of zinc and/or cadmium isocyanate at a temperature between about 100°C and about 350°C where the molar ratio of alkyne to isocyanic acid is from about 2:1 to about 15:1, and
   b. condensing the gaseous reaction products containing said cyano-1-alkenes in a vessel maintained at less than about −25°C and separating the said isocyano-1-alkenes from the other condensates by fractional distillation at sub-atmospheric pressures.

2. The process of claim 1 where the catalyst is zinc isocyanate.

3. The process of claim 1 where the 1-alkyne is ethyne.

4. The process of claim 1 where the isocyanic acid and zinc isocyanate catalyst are prepared in situ by passing a gas containing a hydrogen halide and a 1-alkyne having five or less carbon atoms in a molar ratio of from about 2:1 to about 15:1 into a molten salt mixture comprising an alkali metal isocyanate and a zinc halide at the temperature range of about 250°C to about 350°C.

5. The process of claim 4 where the hydrogen halide is hydrogen chloride, the alkali metal isocyanate is potassium isocyanate and the zinc halide is zinc chloride.

6. The process of claim 1 where the zinc and/or cadmium isocyanate catalyst is supported on an inert inorganic oxide carrier.

7. The process of claim 6 where the carrier is gamma-alumina.

* * * * *